United States Patent [19]

Weber

[11] 4,440,278

[45] Apr. 3, 1984

[54] CLUTCH AND BRAKE DEVICE FOR PRESSES, PUNCHES AND THE LIKE

[75] Inventor: Heinz Weber, Wäschenbeuren, Fed. Rep. of Germany

[73] Assignee: L. Schuler GmbH, Fed. Rep. of Germany

[21] Appl. No.: 503,085

[22] Filed: Jun. 15, 1983

Related U.S. Application Data

[62] Division of Ser. No. 247,739, Mar. 26, 1981, abandoned.

[30] Foreign Application Priority Data

Mar. 26, 1980 [DE] Fed. Rep. of Germany ....... 3011589

[51] Int. Cl.³ ............................................. B60K 41/24
[52] U.S. Cl. ................................................. 192/18 R
[58] Field of Search ................. 192/18 R, 18 A, 18 B, 192/17 R, 113 B, 4 A

[56] References Cited

U.S. PATENT DOCUMENTS

| | | | |
|---|---|---|---|
| 3,000,478 | 9/1961 | Carter | 192/18 A |
| 3,494,450 | 2/1970 | Mankowsky et al. | 192/109 F |
| 4,071,940 | 2/1978 | Hazelton | 192/18 A |
| 4,186,827 | 2/1980 | Spanke | |

*Primary Examiner*—George H. Krizmanich
*Attorney, Agent, or Firm*—Craig & Burns

[57] ABSTRACT

A clutch and brake device for presses, punches, or the like, wherein a drive shaft of the presses or punches may be connected selectively to a flywheel by way of a friction clutch and may be braked with respect to a frame of the press or punch by a friction brake. A bearing for the flywheel is provided at the frame on a tubular extension, with an end section of the drive shaft extending through the tubular extension. The friction clutch and friction brake are arranged on the end section of the drive shaft on a side facing away from the frame at a position beyond the bearing for the flywheel. The friction clutch engages at the flywheel by way of an annular support extending over the friction brake and attached to the flywheel. The friction brake is supported by way of a hollow support extended through the flywheel and encompassing the drive shaft.

4 Claims, 4 Drawing Figures

CLUTCH AND BRAKE DEVICE FOR PRESSES, PUNCHES AND THE LIKE

This is a division of application Ser. No. 247,739, filed Mar. 26, 1981 now abandoned.

The present invention relates to a clutch and brake arrangement and, more particularly, to a clutch and brake device for presses, punches and the like, wherein a drive shaft of the presses or punches may be selectively connected to a flywheel by way of a friction clutch and may be braked with respect to the frame of the press or punch by means of a friction brake, with the bearing for the flywheel being provided at the frame on a tubular extension, and with an end section of the drive shaft extending through the tubular extension.

In Auslegeschrift No. 1,625,835 and corresponding U.S. Pat. No. 3,494,450, a friction clutch and friction brake arrangement are proposed wherein the friction clutch and friction brake are arranged on a side of the flywheel facing the frame within a tubular extension at the frame. More particularly, the friction brake is disposed on a side of the frame with the friction clutch being disposed on a side of the flywheel.

Substantial disadvantages of the above proposed clutch and brake device reside in the fact that access to the friction clutch and friction brake for either investigative and/or servicing operations can only be gained with considerable difficulties. Moreover, the proposed friction clutch and friction brake may be utilized, due to the restricted space conditions, only in expensive special constructions rather than more economical commercially popular items.

In German Pat. No. 903,657, another clutch and brake device for presses, punching machines, or the like is proposed wherein the drive shaft of the machine may be selectively connected by means of a friction clutch to the flywheel and may be braked with respect to the frame by means of a friction brake. The flywheel is supported on an end section of the drive shaft projecting from the frame. In this proposed construction, the friction clutch and the friction brake are arranged on a side of the flywheel facing away from the frame and surround an end section of the drive shaft. More particularly, the friction clutch is disposed in a vicinity of the flywheel and the friction brake is disposed in a zone of an outer end of the end section. A bracket is mounted to the frame and projects beneath the clutch and brake device including the flywheel, with the bracket serving as an additional bearing for the end section of the drive shaft and for absorbing a supporting moment of the friction brake.

Disadvantages of the last mentioned proposed clutch and brake arrangement reside in the fact that the flywheel causes a bending stress to be imposed on the drive shaft and the outwardly projecting bracket impedes a servicing operation of the friction clutch and on the friction brake in addition to making it impossible to effect a simple replacement of drive belts looped around the flywheel.

The aim underlying the present invention essentially resides in providing a clutch and brake device for, for example, presses, punches, or the like, which provides a rugged support for a flywheel, and makes it possible to effect a simple exchange of drive belts looped around such flywheel, in addition to providing good accessibility to the friction clutch and friction brake.

In accordance with advantageous features of the present invention, a clutch and brake device is provided wherein the friction clutch and friction brake are arranged on an end section of the drive shaft projecting beyond a bearing for the flywheel on a side facing away from the frame, with the friction clutch engaging at the flywheel by way of an annular support extending over the friction brake and attached to the flywheel. The friction brake is supported by way of a hollow support extended through the flywheel and surrounding the drive shaft so as to obtain the desireable effects and advantages of the aim of the present invention.

In accordance with the present invention, separate operating elements may be provided for the friction clutch and for the friction brake to operate the clutch and brake device; however, it is also possible to provide a suitable single operating element which may be displaceable in an axial direction of the drive shaft and which may be acted upon in one operating direction so as to, preferably, apply the brake device and disengage the clutch device under the effect of a biasing force such as a spring force, and, in the opposite operating direction to, preferably release the brake device and engage the clutch device by means of, for example, a pressure media.

An especially simple construction of the clutch and brake device may be attained in accordance with the present invention by providing that the tubular extension, intended for supporting the flywheel, simultaneously constitutes the hollow support shaft for carrying the friction brake wherein however the hollow support must absorb the stresses from the bearing moment of the friction brake and from the bearing of the flywheel.

In accordance with further advantageous features of the present invention, in order to absorb the above noted stresses, the tubular extension for supporting the flywheel may encompass a bearing sleeve mounted at the flywheel on a side of the flywheel facing the frame. The hollow support carrying the friction brake and attached to the frame may be arranged within the bearing sleeve.

In order to open up the possibility of selectively effecting the braking of the drive shaft by way of the friction brake or of coupling the drive shaft with a slow motion or creep drive with a worm gear wheel mechanism, it is possible, on the one hand, to arrange within the tubular extension supporting the flywheel a hollow or quill shaft surrounding the drive shaft, with an end of the hollow shaft facing away from the frame carrying the support for the friction brake and the end of the hollow shaft facing the frame carrying a worm wheel engaged by a worm which is adapted to be driven and arrested and which is supported in the tubular extension. On the other hand, it is also possible to provide that the tubular extension for carrying the flywheel surrounds a bearing sleeve attached to the flywheel on a side of the flywheel facing the frame through the interposition of a hollow shaft. Within the bearing sleeve a further hollow shaft may be arranged which surrounds the drive shaft, with the end of the last mentioned hollow shaft facing away from the frame and carrying the support for the friction brake. The two hollow shafts may be joined together at their ends facing the frame and carry, at the joining location, a worm wheel engaged by a worm supported within the tubular extension and capable of being driven and arrested.

Accordingly, it is an object of the present invention to provide a clutch and brake device for presses, punches, and the like which avoids, by simple means, shortcomings and disadvantages encountered in the prior art.

Another object of the present invention resides in providing a clutch and brake device for presses, punching machines, and the like which ensures good accessibility to the friction clutch and friction brake of the clutch and brake devices.

Yet another object of the present invention resides in providing a clutch and brake device for presses, punching machines, and the like which may be readily utilized in commercial designs.

A still further object of the present invention resides in providing a clutch and brake device for presses, punching machines, and the like which is simple in construction and therefore relatively inexpensive to manufacture.

A still further object of the present invention resides in providing a clutch and brake device for presses, punching machines, and the like which functions reliably under all operating conditions.

Another object of the present invention resides in providing a clutch and brake device for presses, punching machines, and the like which enables a simple replacement of drive means and/or other components of the clutch and brake device.

These and other objects, features, and advantages of the present invention will become more apparent from the following description when taken in connection with the accompanying drawings which show, for the purposes of illustration only, several embodiments in accordance with the present invention, and wherein.

Figure 1:
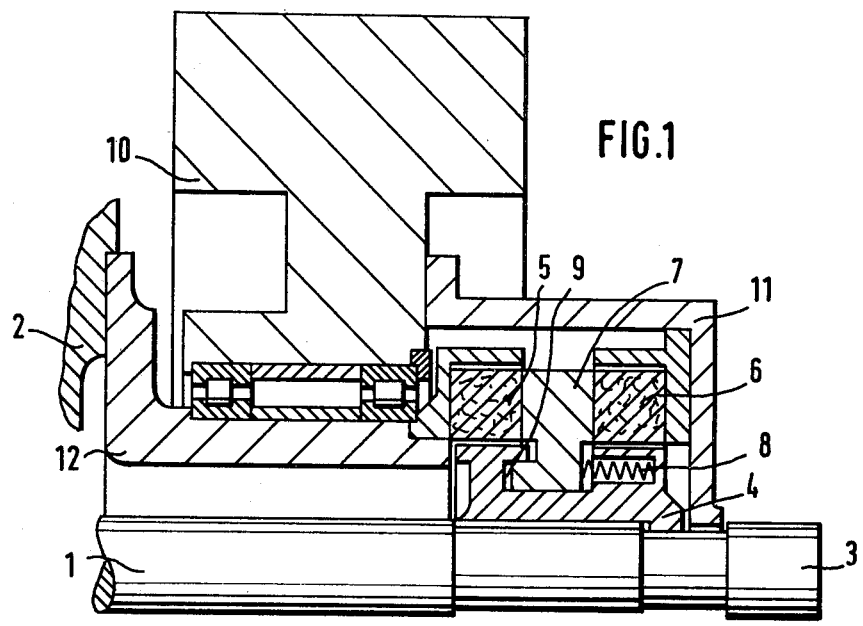
FIG. 1 is a partially schematic longitudinal cross sectional view of a first embodiment of a clutch and brake device constructed in accordance with the present invention.

Referring now to the drawings wherein like reference numerals are used throughout the various views to designate like parts and, more particularly, to FIG. 1, according to this figure, a drive shaft 1 of, for example, a press, punching machine, or the like, includes an end section which projects outwardly from a press frame 2. A stationary feed head 3, rotatable with respect to the drive shaft 1 is spaced from the press frame and carried at an outer end of the drive shaft 1. Supply and discharge lines for supplying a pressure medium from a pressure medium source (not shown) to the clutch and brake device, in a conventional manner, are extended through the feed head 3.

A hub 4 is attached to the end section of the drive shaft 1 a small axial spacing from the feed head 3. The hub 4 connects the friction disks associated with the drive shaft 1 and pertaining to a friction brake 5 and to a friction clutch 6 so that the friction disks rotate with the hub 4. An operating element 7, intended for and common to both the friction brake 5 and the friction clutch 6, is disposed on the hub at a position between the friction brake 5 and the friction clutch 6, with the operating element 7 being adapted to be displaceable in an axial direction of the drive shaft 1. Compression springs 8 are provided for acting upon the operating element 7 so as to urge the same in a direction toward the press frame 2. The operating element 7 is acted upon in an opposite direction by a pressure medium supplied from the pressure medium source through the feeder head to a pressure medium chamber 9 so that the friction disks of the friction clutch and the friction disks of the friction brake can be selectively connected by frictional engagement with associated counter friction disks. The counter disks of the friction clutch are connected to an annular support or ring carrier 11 which extend over the friction brake 5 and are attached to a flywheel 10 for rotation with the annular support or ring carrier 11.

As shown in FIG. 1, the flywheel 10 is supported on a tubular extension 12 attached to the frame 2. The tubular extension 12 simultaneously forms a hollow support surrounding the drive shaft 1. The counter disks of the friction brake 5 are connected with an end of the hollow support formed by the tubular extension 12 which faces away from the frame 2.

Figure 2:
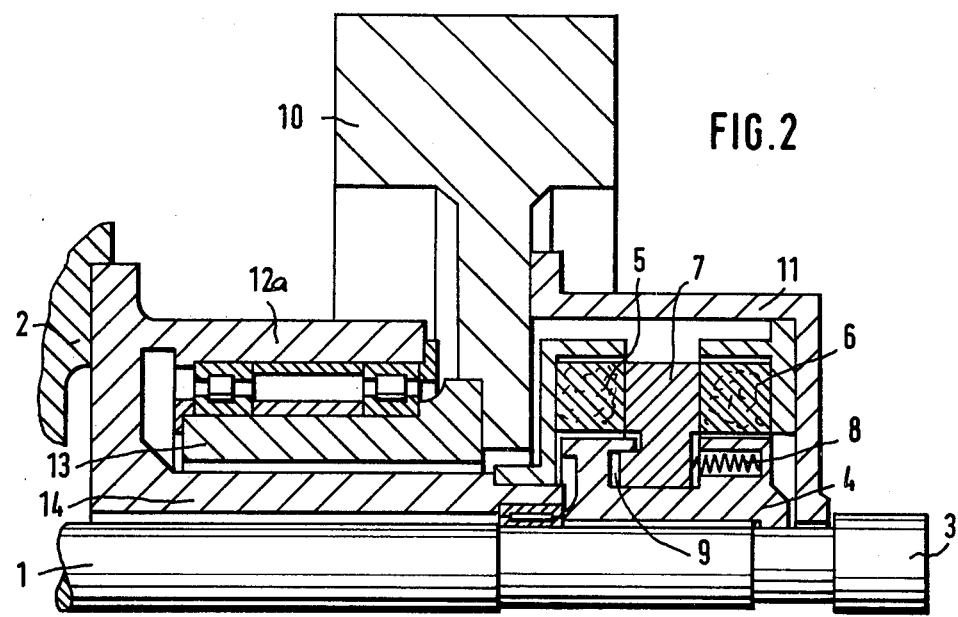
FIG. 2 is a partially schematic longitudinal cross sectional view of a second embodiment of a clutch and brake device constructed in accordance with the present invention.

As shown in FIG. 2, a tubular extension 12a may be attached to the frame 2, with the tubular extension 12a encompassing a bearing sleeve 13 mounted to the flywheel 10 on a side of the flywheel 10 facing the press frame 2. By virtue of the provision of the bearing sleeve 13, the flywheel 10 is supported at the tubular extension 12a. A hollow support 14 is arranged within the bearing sleeve 13, with the hollow support surrounding the drive shaft 1 and being mounted to the frame 2. The counter disks of the friction brake 5 are connected for rotation with an end of the hollow support 14 facing away from the frame 2.

Figure 3:
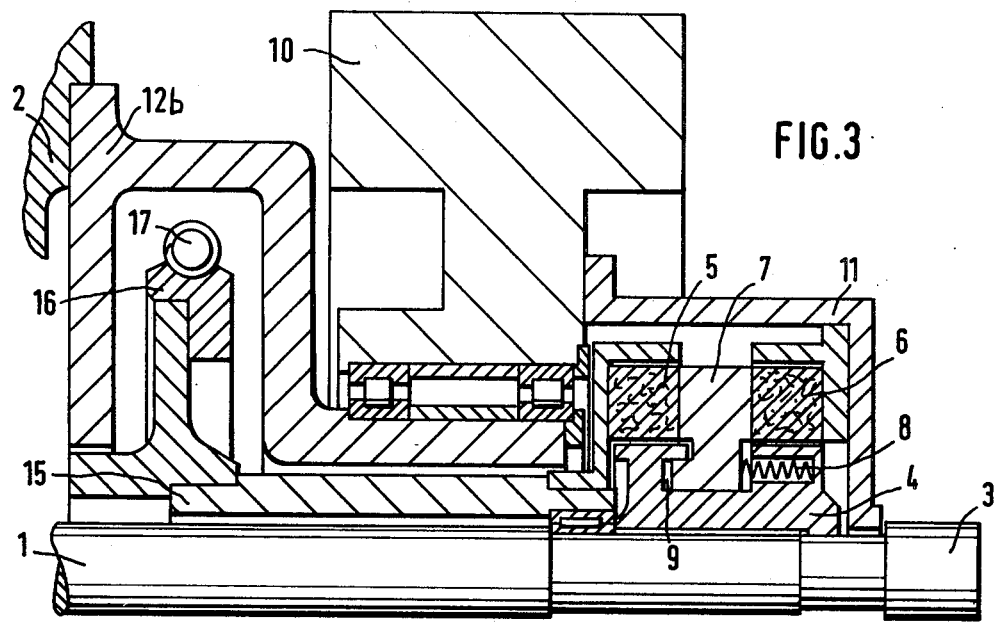
FIG. 3 is a partially schematic longitudinal cross sectional view of a clutch and brake device constructed in accordance with a third embodiment of the present invention.

A tubular extension 12b, as shown in FIG. 3, may be attached to the frame 2 with the flywheel 10 being supported on the tubular extension 12b. A hollow or quill shaft 15 is disposed within the tubular extension 12b, with the hollow shaft 15 surrounding the drive shaft 1. An end of the hollow shaft 15 facing away from the frame 2 is connected for rotation with the counter disks of the friction brake 5, while an end of the hollow shaft 15 facing the frame 2 is provided with a worm wheel 16 engaged by a worm 17 supported in the tubular extension 12b. The worm wheel 16 is adapted to be driven and arrested or stopped.

Figure 4:
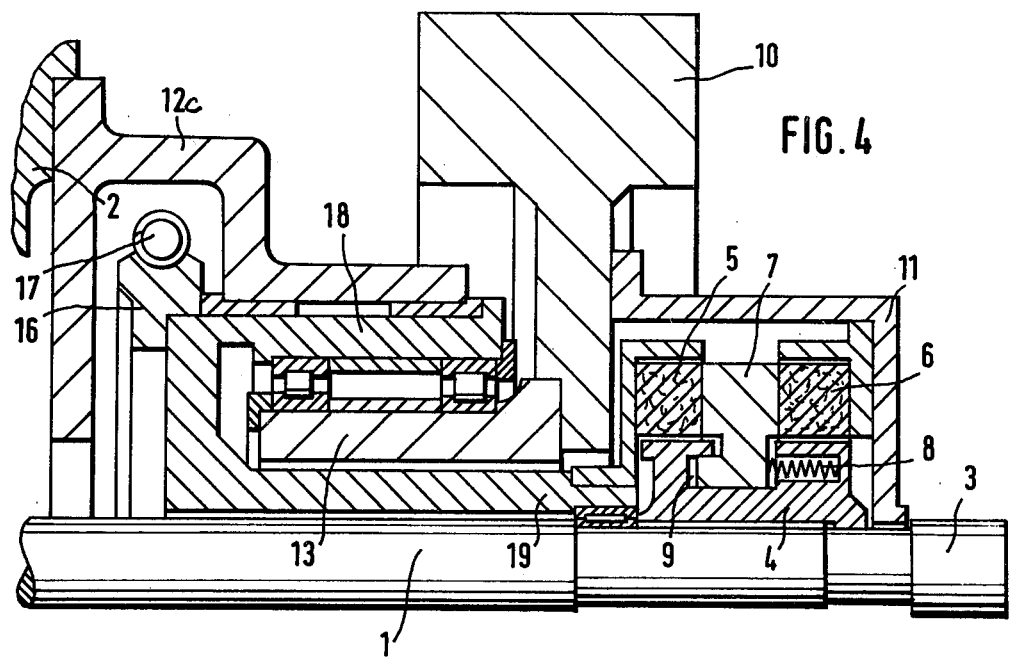
FIG. 4 is a partially schematic longitudinal cross sectional view of a fourth embodiment of a clutch and brake device constructed in accordance with the present invention.

As shown in FIG. 4, a tubular extension 12c may be attached to the frame 2, with the tubular extension 12c surrounding a bearing sleeve 13 attached to the flywheel 10 on a side of the flywheel 10 facing the frame 2. A hollow shaft 18 is interposed between the bearing sleeve 13 and the tubular extension 12c, with the flywheel 10 being supported at the tubular extension 12c by the bearing sleeve 13 and hollow shaft 18. Another hollow shaft 19 is arranged within the bearing sleeve 13, with the hollow shaft 19 surrounding the drive shaft 1. Counter disks of the friction brake 5 are connected for rotation with an end of the hollow shaft 19 facing away from the frame 2. The ends of the hollow shafts 18, 19 facing the frame 2 are joined together. A worm wheel 16, engaged by a worm 17 and supported in the tubular extension 12c, is disposed at an area wherein the two hollow shafts 18, and 19 are joined together, with the worm wheel 16 being capable of being driven and arrested or stopped.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A clutch and brake for a press or punch having a flywheel means, and a drive shaft means having an end projecting beyond a support frame of the punch or press, the arrangement including
    a friction clutch means for selectively connecting the drive shaft means to the flywheel means,
    a friction brake means for selectively braking the drive shaft means,
    a hollow support means extending through the flywheel means and surrounding the drive shaft means is provided for supporting the friction brake means,
    an annular support means extends over the friction brake means and is attached to the flywheel means for enabling an engagement of the flywheel means with the drive shaft means by the friction clutch means,
    a bearing means is provided for supporting the flywheel means on the hollow support means projecting beyond the support frame, the bearing means is arranged between the support frame and the friction clutch means and friction brake means, wherein
    the hollow support means includes a hollow shaft having an end facing the support frame and an opposite end forming a support for the friction brake means,
    a tubular extension is attached to the support frame and surrounds the hollow shaft for supporting the flywheel means,
    a worm gear means is mounted on an end of the hollow shaft facing the support frame, and
    a worm drive means adapted to be selectively driven and stopped is disposed in the tubular extension and is engageable with a worm gear means.

2. The arrangement according to claim 1, characterized in that the bearing means includes a bearing assembly interposed between the tubular extension and the flywheel means.

3. The arrangement according to claim 1 characterized in that means are arranged on the drive shaft means between the friction clutch means and the friction brake means for enabling a selective actuation of the clutch means and the brake means.

4. The arrangement according to claim 3, characterized in that the means for enabling the selective actuation includes an actuating member mounted on a hub disposed on the drive shaft means, the actuator being adapted to be displaced in an axial direction of the drive shaft means so as to cause selective engagement and disengagement with the friction clutch means and the friction brake means.

* * * * *